United States Patent [19]

Haas et al.

[11] 4,097,127

[45] Jun. 27, 1978

[54] MIXED LIQUID CRYSTALLINE TEXTURE FORMATION

[75] Inventors: Werner E. L. Haas, Webster; Gary A. Dir, Fairport, both of N.Y.

[73] Assignee: Xerox Corporation, Stamford, Conn.

[21] Appl. No.: 773,448

[22] Filed: Mar. 2, 1977

[51] Int. Cl.$^2$ .............................................. G02F 1/13
[52] U.S. Cl. ...................................... 350/332; 350/346
[58] Field of Search ........................... 350/150, 160 LC

[56] References Cited

U.S. PATENT DOCUMENTS

| | | | |
|---|---|---|---|
| 3,642,348 | 2/1972 | Wysocki et al. | 350/160 LC |
| 3,652,148 | 3/1972 | Wysocki et al. | 350/150 |
| 3,680,950 | 8/1972 | Haas et al. | 350/150 |
| 3,703,331 | 11/1972 | Goldmacher et al. | 350/160 LC |
| 3,781,088 | 12/1973 | Tsukamoto et al. | 350/160 LC |
| 3,790,251 | 2/1974 | Wysocki et al. | 350/160 LC |
| 3,792,915 | 2/1974 | Oh et al. | 350/160 LC |
| 3,806,230 | 4/1974 | Haas | 350/160 LC |
| 3,960,439 | 6/1976 | Becker et al. | 350/160 LC |
| 3,972,588 | 8/1976 | Adams et al. | 350/160 LC |

*Primary Examiner*—Edward S. Bauer

[57] ABSTRACT

A mixture of the Grandjean texture and the focal-conic texture of the cholesteric mesophase is created by applying an electrical field to a liquid crystalline material in either the focal-conic or Grandjean texture of the cholesteric mesophase of a magnitude sufficient to transform the liquid crystalline material from the cholesteric mesophase to the nematic mesophase; and, decreasing the magnitude of said electrical field over a period of time effective to transform the liquid crystalline material from the nematic mesophase to a mixture of the Grandjean and focal-conic textures of the cholesteric mesophase.

6 Claims, No Drawings

MIXED LIQUID CRYSTALLINE TEXTURE FORMATION

BACKGROUND OF THE INVENTION

This invention relates to the transformation of liquid crystalline materials; and, more particularly, to the formation of a mixed Grandjean and focal-conic texture of the cholesteric mesophase.

Many chemical compounds and mixtures have been found to exhibit physical characteristics some of which are typically associated with liquids and others which are typically unique to solid crystals. Liquid crystalline substances typically exhibit the mechanical characteristics, such as viscosities, which are ordinarily associated with liquids. In addition, the optical scattering and transmission characteristics of liquid crystalline substances are similar to those characteristics which are typically unique to solid crystals. Because of these similarities to both the liquid and crystalline forms of matter, the name "liquid crystals" has become generic to substances exhibiting these dual properties.

The molecular structure of liquid crystals helps to explain their dual characteristics. In liquid or fluid substances, the molecules are typically randomly distributed and oriented throughout the mass. Conversely, in crystalline solids the molecules are typically rigidly oriented and arranged in a specific crystalline structure. Liquid crystals resemble solid crystals in that the molecules of the liquid crystalline substance are regularly oriented in a fashion analogous to but less extensive than the molecular orientation and structure in a crystalline solid. It has been observed that many substances exhibit liquid crystalline characteristics only in a relatively narrow temperature range; below this temperature range the substances appear only as crystalline solids, and above the temperature range they appear only as liquids. Liquid crystals are known to appear in at least three different forms: the smectic, nematic, and cholesteric forms. These structural forms are sometimes referred to as mesophases, thereby indicating that they are states of matter intermediate between the liquid and crystalline states.

In the smectic structure the molecules are arranged in layers with their major axes approximately parallel to each other and approximately normal to the planes of said layers. Within a given layer the molecules may be organized in uniform rows, or randomly distributed throughout the layer, but in either case the major axes are still approximately normal to the plane of the layer. The attractive forces between layers are relatively weak so that the layers are free to move in relation to each other, thereby providing the smectic liquid crystalline substance with the mechanical properties of a planar or two-dimensional, soap-like fluid.

In the nematic structure, the major axes of the molecules lie approximately parallel to each other, but the molecules are not organized into definite layers as in the smectic structure.

In the cholesteric structure, the molecules are believed to be arranged in definite layers as in the smectic structure; however, within a given layer, the molecules are believed to be arranged with their major axes approximately parallel in a fashion resembling the structure of nematic liquid crystals. Because the major axes of the molecules in the cholesteric structure are believed to be parallel to the planes of the layers, the molecular layers are very thin. The cholesteric liquid crystalline structure typically have molecules which are derivatives of cholesterol or which are shaped very similarly to molecules of cholesterol. Because of the shape of the cholesteric molecule, in the cholesteric structure the direction of the major axes of the molecules in each of the aforementioned thin layers is displaced slightly from the direction of the major molecular axes in the adjacent molecular layers. When compared to a hypothetical straight line axis passing through a cholesteric liquid crystalline substance and perpendicular to the molecular planes within said substance, the angular displacement of the direction of the molecular axes within each adjacent molecular layer traces out a helical path around the hypothetical straight line axis.

Cholesteric liquid crystals are known to exhibit various observable textures. For example, cholesteric liquid crystals may adopt a homeotropic, a focal-conic, or a Grandjean plane texture as modifications of the cholesteric mesophase itself, as described, for example, in Gray G. W., "Molecular Structure in the Properties of Liquid Crystals", Academic Press, London, 1962, pages 39-54. The application of an electric field to a liquid crystalline material in the Grandjean texture of the cholesteric mesophase to transform the material from the Grandjean texture to the focal-conic texture of the cholesteric mesophase is known. See, for example, U.S. Pat. No. 3,704,056 to Wysocki et al.

The application of an electrical field to a liquid crystalline material in the cholesteric mesophase to transform the material from the cholesteric mesophase to the nematic mesophase is known. See, for example, U.S. Pat. No. 3,652,148.

Phase transforming a liquid crystalline material from the Grandjean texture of the cholesteric mesophase to the homeotropic texture of the nematic mesophase by an applied electrical field and then abruptly switching off the applied electrical field to cause reversion of the liquid crystalline material from the nematic mesophase to the Grandjean texture of the cholesteric mesophase is reported in "Electric Field Induced Texture Changes in Certain Nematic/Cholesteric Liquid Crystal Mixtures", W. Greubel et al., Vol. 24, Molecular Crystals and Liquid Crystals, pages 103-111, 1973. Therein, it is also reported on page 105 that if the liquid crystalline material is only partly brought into the electrical field induced nematic mesophase by increasing the field very slowly, then upon abruptly switching off the applied electrical field, only the areas with nematic alignment will return to the planar (Grandjean) texture. The other parts of the initially Grandjean texture which were not transformed into the nematic mesophase by the slowly applied electrical field shows the focal-conic texture of the cholesteric mesophase.

We have now discovered that a liquid crystalline material transformed by an applied electrical field into the nematic mesophase from either the focal-conic or Grandjean texture of the cholesteric mesophase can be transformed into a mixture of the focal-conic texture and the Grandjean texture of the cholesteric mesophase by decreasing the amplitude of the applied electrical field over a period of time effective to form the mixture. This discovery differs from that reported in the Greubel et al. article. In that article their end result of focal-conic region and Grandjean texture region as reported on page 105 of the article is not a mixture of two textures but two regions of different textures which come from two sources: the focal-conic texture comes from the initially Grandjean texture which did not transform into the nematic mesophase during slow application of the electrical field; and, the Grandjean texture in the mixture comes from the portion of the liquid crystalline material which did transform into the nematic mesophase. These two regional textures are formed by abruptly switching off the applied electrical field. On the other hand, our discovery is that liquid crystalline material initially in either the focal-conic or Grandjean texture of the cholesteric mesophase and transformed into the nematic mesophase can be transformed from the nematic mesophase into a mixture of the focal-conic and Grandjean textures of the cholesteric mesophase by a controlled decrease of the magnitude of the applied electrical field. Only the regions transformed into the neumatic mesophase are transformed into the focal-conic and Grandjean texture mixture. The regions of the Grandjean or focal-conic texture of the initial cholesteric mesophase which were not transformed into the nematic mesophase remain in their initial focal-conic or Grandjean texture.

SUMMARY OF THE INVENTION

It is, therefore, an object of this invention to provide a novel method for forming a mixture of the Grandjean and focal-conic textures of the cholesteric mesophase.

It is a further object of this invention to provide a method of forming a mixture of the Grandjean and focal-conic textures of the cholesteric mesophase from a liquid crystalline material in the nematic mesophase.

These and other objects of the present invention are provided in accordance with the practice of the present invention by applying an electrical field to a liquid crystalline material in either the Grandjean or focal-conic texture of the cholesteric mesophase, the applied electrical field being within the cholesteric to nematic electrical field range of said liquid crystalline material, to transform the liquid crystalline material into the nematic mesophase; and then decreasing the magnitude of the applied electrical field over a period of time effective to transform the liquid crystalline material from the nematic mesophase to the mixture of the Grandjean and focal-conic textures of the cholesteric mesophase. Typical suitable times for field removal range from about 10 to about 200 milli-seconds.

DESCRIPTION OF THE PREFERRED EMBODIMENTS

The first portion of the practice of the present invention, i.e., applying an electrical field to a liquid crystalline material in either the Grandjean or focal-conic texture of the cholesteric mesophase to transform the material into the nematic mesophase, the applied electrical field being within the cholesteric to nematic electrical field range of said liquid crystalline material, is amply described in U.S. Pat. No. 3,652,148, hereby expressly incorporated by reference. While that patent is generically directed to the broader invention of transforming an optically negative liquid crystalline material into an optically positive liquid crystalline material by applying an electrical field across the material, the lists of liquid crystalline materials and mixtures thereof, the description of cell fabrication, the electrical field strengths required for phase transformation, etc., are described in detail in U.S. Pat. No. 3,652,148. These need not be elaborated upon herein. Furthermore, a whole host of liquid crystalline materials and mixtures thereof typically suitable for providing a liquid crystalline material in the Grandjean or focal-conic textures of the cholesteric mesophase are listed in U.S. Pat. Nos. 3,704,056 and 3,680,950 hereby expressly incorporated by reference. Other typical suitable liquid crystalline materials in the Grandjean texture of the cholesteric mesophase comprise: a mixture of about 1 part by weight cholesteryl oleyl carbonate and about 2 parts by weight p'-pentyl-p-cyanobiphenyl; methoxybenzylidene-butylaniline(MBBA); about 10 parts by weight TN-100 (Hoffmann LaRoche) and about 4 parts by weight cholesteryl oleyl carbonate and about 95% by weight K15 (4-cyano-4'-n-pentyl biphenyl) and about 5% by weight cholesterol chloride.

Once the Grandjean or focal-conic texture of the cholesteric mesophase has been transformed into the nematic mesophase by an application of an electrical field within the cholesteric-to-nematic electrical field range of the liquid crystalline material, the magnitude of the applied electrical field is decreased over a period of time effective to transform the liquid crystalline material from the nematic mesophase into the mixture of the Grandjean and focal-conic textures of the cholesteric mesophase. The period of time is greater than an abrupt switching off of the applied electrical field and less than the electrical field removal time period for the liquid crystalline material to become completely focal-conic. That is, we have discovered that if the applied electrical field amplitude is decreased over a sufficiently long period of time, greater than about 200 milli-seconds the liquid crystalline material in the nematic mesophase will transform completely into the focal-conic texture of the cholesteric mesophase. The aforementioned Greubel et al. article reports that the abrupt switching off of the applied electrical field causes the nematic mesophase to transform completely into the Grandjean texture of the cholesteric mesophase. Thus, the period of time over which the applied electrical field is to be reduced in accordance with the practice of the present invention in order to achieve a transformation from the nematic mesophase into a mixture of the Grandjean texture and focal-conic texture of cholesteric mesophase, is inbetween the abrupt turn off of Greubel et al. and the very slow turn off resulting in the complete transformation from nematic mesophase to focal-conic texture of the cholesteric mesophase.

This period of time to be utilized in decreasing the applied electrical field in accordance with the practice of the present invention, varies from material to material. However, utilizing our reported discovery, one skilled in the art can readily find the appropriate period of time with which to practice the present invention for any given material simply by phase transforming a liquid crystalline material from the Grandjean texture of the cholesteric mesophase into the nematic mesophase by applying an electrical field within the cholesteric-to-nematic electrical field range of the liquid crystalline material; and, then, decreasing the magnitude of the applied electrical field over various periods of time at least two of which do not result in a mixture of the Grandjean and focal-conic textures, one of the two period of times yielding complete transformation into the Grandjean texture of the cholesteric mesophase and the other period of time resulting in the complete transformation into the focal-conic texture of the cholesteric mesophase. Then, one skilled in the art should readily appreciate that the period of time over which the applied electrical field is to be decreased in accordance with the practice of this invention is one lying between these two extremes. A typically suitable range is from about 10 to about 200 milli-seconds. Furthermore, the period of time to be utilized can be varied between these two extremes to obtain varying relative amounts of the Grandjean and focal-conic textures in the mixture. At the lower range of the time period between these two extremes, the Grandjean texture predominates; whereas, at the upper range of the time period between these two extremes, the focal-conic texture predominates.

Variations in the relative amounts of each texture in the mixture of Grandjean and focal-conic textures will result in variations in brightness and contrast of the resulting image. The various electro-optic cells used for imaging in U.S. Pat. No. 3,652,148 can be employed in the practice of the present invention to provide photoconductor address, electron beam address, X-Y matrix address, shaped electrode address, shaped liquid crystalline layer imaging, etc. Enhanced brightness and contrast in imaging is provided by selectively varying the relative amounts of Grandjean and focal-conic textures in the mixture resulting from the practice of the present invention.

The following examples further specifically define the present invention with respect to forming a mixture of the Grandjean and focal-conic textures. The parts and percentages are by weight unless otherwise indicated. The examples below are intended to illustrate various preferred embodiments of the present invention.

EXAMPLE I

A mixture of about 95% by weight K15 (4-cyano-4'-n-pentyl biphenyl) available from British Drug House and about 5% by weight cholesterol chloride is placed at a thickness of about 10 microns between two electrodes. Each electrode comprises a glass slide overcoated with a layer of indium oxide over which silicon monoxide is deposited in accordance with the Janning technique. This technique is reported in "Thin Film Surface Orientation For Liquid Crystals", J. Appl. Phys. Letter, Vol. 21, No. 4, August 15, 1972. This silicon monoxide is deposited at an angle of 60° from the normal to the glass slide.

The cholesteric to nematic transition voltage threshold for the mixture used is about 10 volts. This voltage is applied between the two electrodes and the initially Grandjean texture of the cholesteric mesophase is transformed into the nematic mesophase. The entire layer of liquid crystalline material is transformed into the nematic mesophase.

The applied voltage of about 10 volts is decreased in magnitude to about 0 within a time period of about 1 micro-second. The entire layer of liquid crystalline material assumes the Grandjean texture of the cholesteric mesophase. The applied voltage of about 10 volts is decreased in magnitude to about 0 over periods of time varying up to about 10 micro-seconds. In each case, the entire layer of liquid crystalline material assumes the Grandjean texture.

The applied voltage of about 10 volts is decreased in amplitude to about 0 volts over various time periods ranging from about 10 milli-seconds to about 200 milli-seconds. The entire liquid crystalline layer becomes a mixture of the Grandjean and focal-conic textures of the cholesteric mesophase.

The applied voltage of about 10 volts is reduced in amplitude to about 0 over varying time periods greater than about 200 milli-seconds. In each case, the entire liquid crystalline layer assumes the focal-conic texture of the cholesteric mesophase.

EXAMPLE II

Example I is repeated except that the indium oxide coatings on the glass slides are shaped in the form of a letter "X".

When the applied about 10 volts is decreased in magnitude over a period of time between about 10 to about 200 milli-seconds, the region of the liquid crystalline layer corresponding to the shaped electrodes in the form of a "X" is a mixture of the focal-conic and Grandjean textures of the cholesteric mesophase. The "Background" region of the liquid crystalline layer; i.e. that region of the layer outside the boundaries of the shaped electrodes exhibits the Grandjean texture of the cholesteric mesophase.

When the applied voltage of about 10 volts is decreased in magnitude to about 0 over a time period varying from about 1 to about 10 micro-seconds, the entire layer of liquid crystalline material, including that corresponding to the shaped electrodes, exhibits the Grandjean texture.

When the applied about 10 volts is decreased in magnitude to about 0 over periods of time greater than about 200 milli-seconds, the region of the liquid crystalline layer corresponding to the shaped electrodes exhibits the focal-conic texture of the cholesteric mesophase and the background region of the liquid crystalline layer exhibits the Grandjean texture of the cholesteric mesophase.

In preferred embodiments of the present invention, as in the Examples, the liquid crystalline material initially provided in either the Grandjean texture or the focal-conic texture of the cholesteric mesophase, comprises a mixture of a nematic and an optically active material. The optically active material can be either mesomorphic or non-mesomorphic, as is well-known in the art. See, for example, U.S. Pat. No. 3,909,114, hereby expressly incorporated by reference, at Columns 5 and 6 thereof, for a listing of a whole host of nematic and mesomorphic and non-mesomorphic optically active materials which can be utilized. The combination of a nematic liquid crystalline material and an optically active material is particularly preferred to provide enhanced storage of the mixture of Grandjean and focal-conic textures provided in accordance with the practice of the present invention. Since the voltage applied to transform the initially Grandjean or focal-conic texture of the cholesteric mesophase into the nematic mesophase is decreased in magnitude over a period of time in accordancce with the practice of the present invention, it will be appreciated that when the applied voltage is reduced in magnitude to about 0, the liquid crystalline layer must have "memory" or "storage" in order for the resulting Grandjean and focal-conic texture mixture to have persistence after the about zero applied voltage is reached. Liquid crystalline materials having the structure of the cholesteric mesophase exhibit this persistence or storage. Therefore, a cholesteric liquid crystalline material or a nematic liquid crystalline material and an optically active material can be employed to achieve this persistence or storage.

While the present invention has been described with respect to preferred embodiments, it will be appreciated, upon a reading of the present disclosure, that other modifications and variations may be made without departing from the spirit of the present invention. These are intended to be included within the scope of the present invention.

What is claimed is:

1. A method of forming a mixture of the Grandjean and focal-conic textures of the cholesteric mesophase, comprising:
   (a) providing a liquid crystalline material in a texture selected from the group consisting of the Grandjean texture and the focal-conic texture of the cholesteric mesophase;
   (b) applying an electrical field across said liquid crystalline material within the cholesteric-to-nematic electrical field range of said liquid crystalline material thereby transforming said liquid crystalline material from the cholesteric mesophase to the nematic mesophase; and
   (c) decreasing the magnitude of said applied electrical field over a period of time effective to transform said liquid crystalline material from the nematic mesophase to said mixture of the Grandjean and focal-conic textures of the cholesteric mesophase.

2. The method of claim 1 wherein said period of time within step (c) is from about 10 to about 200 milliseconds.

3. The method according to claim 1 wherein said electrical field is applied in imagewise configuration.

4. The method of claim 1 wherein said liquid crystalline material comprises a nematic liquid crystalline material and an optically active material.

5. The method according to claim 1 wherein said liquid crystalline material is in the Grandjean texture of the cholesteric mesophase.

6. The method according to claim 5 wherein said electrical field is applied in imagewise configuration resulting in an imagewise configured mixture of the Grandjean and focal-conic textures of the cholesteric mesophase surrounded by a background region of the liquid crystalline material in the Grandjean texture of the cholesteric mesophase.

* * * * *